(12) United States Patent
Baratto et al.

(10) Patent No.: US 11,642,639 B2
(45) Date of Patent: May 9, 2023

(54) MULTI-BED CATALYTIC CONVERTER

(71) Applicant: CASALE SA, Lugano (CH)

(72) Inventors: Francesco Baratto, Como (IT);
Pierdomenico Biasi, Como (IT);
Davide Carrara, Fino Mornasco (IT);
Sergio Panza, Como (IT)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 16/772,889

(22) PCT Filed: Dec. 11, 2018

(86) PCT No.: PCT/EP2018/084327
§ 371 (c)(1),
(2) Date: Jun. 15, 2020

(87) PCT Pub. No.: WO2019/121155
PCT Pub. Date: Jun. 27, 2019

(65) Prior Publication Data
US 2021/0162361 A1   Jun. 3, 2021

(30) Foreign Application Priority Data
Dec. 21, 2017 (EP) ................................... 17209725

(51) Int. Cl.
*B01J 8/04* (2006.01)
*C01C 1/04* (2006.01)

(52) U.S. Cl.
CPC ........... *B01J 8/0492* (2013.01); *B01J 8/0496* (2013.01); *C01C 1/0411* (2013.01);
(Continued)

(58) Field of Classification Search
CPC ...... B01J 8/0496; B01J 8/0492; B01J 8/0469; B01J 8/0434; B01J 8/0415; B01J 8/0426;
(Continued)

(56) References Cited

U.S. PATENT DOCUMENTS 4,372,920 A * 2/1983 Zardi ..................... B01J 8/0005
422/148
4,963,338 A   10/1990 Zardi et al.
(Continued)

FOREIGN PATENT DOCUMENTS

CA   1211615 A   9/1986
EP   1661860 A1   5/2006
(Continued)

OTHER PUBLICATIONS

International Preliminary Report on Patentability from International Application No. PCT/EP2018/084327 completed Nov. 19, 2019.
(Continued)

*Primary Examiner* — Lessanework Seifu
(74) *Attorney, Agent, or Firm* — Dorsey & Whitney LLP

(57) ABSTRACT

A multi-bed catalytic converter comprising: a plurality of catalytic beds which are traversed in series by a process gas, sequentially from a first catalytic bed to a last catalytic bed of said plurality, and at least one inter-bed heat exchanger (7) positioned between a first catalytic bed and a second catalytic bed of said plurality, wherein at least the last catalytic bed of said plurality is adiabatic and is made of fine catalyst with a particle size not greater than 2 mm.

15 Claims, 3 Drawing Sheets

(52) U.S. Cl.
CPC ... *C01C 1/0417* (2013.01); *B01J 2208/00212* (2013.01); *B01J 2208/00672* (2013.01); *B01J 2208/00938* (2013.01); *B01J 2208/024* (2013.01)

(58) Field of Classification Search
CPC .............. B01J 8/043; B01J 2208/00212; B01J 2208/00672; B01J 2208/00938; B01J 2208/024; B01J 2208/025; B01J 2208/00336; C01C 1/0411; C01C 1/0417
See application file for complete search history.

(56) References Cited

U.S. PATENT DOCUMENTS

| | | | |
|---|---|---|---|
| 5,427,760 A | 6/1995 | Grotz | |
| 6,299,849 B1* | 10/2001 | Pagani | B01J 8/008 422/148 |
| 2006/0099131 A1* | 5/2006 | Singh | C01C 1/0423 423/361 |
| 2013/0023594 A1 | 1/2013 | Van et al. | |
| 2018/0186649 A1* | 7/2018 | Carrara | C01C 1/0417 |

FOREIGN PATENT DOCUMENTS

| | | |
|---|---|---|
| EP | 2829317 A1 | 1/2015 |
| EP | 3115338 A1 | 1/2017 |
| GB | 2055606 A | 3/1981 |
| JP | 2007277160 A | 10/2007 |
| WO | 0032543 A9 | 11/2000 |
| WO | 0123080 A1 | 4/2001 |
| WO | 2005047216 A1 | 5/2005 |

OTHER PUBLICATIONS

International Search Report from International Application No. PCT/EP2018/084327 dated Mar. 20, 2019.

Junger, "Revamping: breathing new life into old ammonia plants", Nitrogen, British Sulphur Co., No. 191, XP000205618, May 1, 1991, pp. 42-44, 46.

* cited by examiner

MULTI-BED CATALYTIC CONVERTER

FIELD OF APPLICATION

The invention relates to the technical field of multi-bed catalytic converters. In particular, the invention relates to inter-cooled multi-bed converters and a method of revamping thereof.

PRIOR ART

A multi-bed catalytic converter of the type considered herein comprises: a plurality of adiabatic catalytic beds with radial or axial-radial flow arranged in series so that the effluent of a bed is further reacted in the subsequent bed, inter-bed heat exchangers arranged between consecutive beds to cool the effluent of a bed before admission into the subsequent bed, and optionally a bottom heat exchanger after the last bed of said plurality.

Converters of this type are widely used, for example, for the synthesis of ammonia from a make-up synthesis gas containing hydrogen and nitrogen. Conversion of said make-up gas into ammonia exhibits highest performances over iron-based catalysts. Alternative catalysts may be selected among iron-based modified, iron-based promoted, iron-based promoted with nanoparticles, iron-cobalt, cobalt supported, ruthenium promoted and ruthenium supported.

The catalyst composition is not the only factor influencing the performances of a process; the size and the shape of the catalyst particles also play a significant role.

Catalysts with fine particles are advantageous for the purposes of the process because, for the same volume available to the catalytic bed, they decrease the problem related to diffusion limitations, ensure a closer and more uniform contact with the reagents and improve the performance efficiency and the conversion yield of the process. However, the smaller size of the particles of catalyst tends to increase the pressure drops of the converter. In addition, small particles of catalyst are problematic to retain. A catalyst is normally retained by a gas-permeable collector having suitable openings. A fine catalyst requires small openings which are most subject to the risk of obstruction, which would further increase the pressure drop and reduce the performance. Moreover, for a given gas through-flow cross-section, smaller openings would be required to be in a greater number and closer one to each other, structurally weakening the collector itself.

The current prior art uses catalysts with particles ranging from 1.5 to 3 mm which are deemed a best compromise in terms of catalyst activity and pressure drops of the converter. Said dimensions are currently preferred in particular for a catalyst for the synthesis of ammonia.

WO 2005/047216 discloses an axial-flow reactor for the hydrogenation of olefins comprising several stages wherein the catalyst employed has different particle size and/or different shape in at least two stages.

EP 1 661 860 discloses an axial-flow tubular converter for ammonia synthesis and further discloses that said converted can be installed as an add-on feature to an existing plant. However a revamping based on add-on (i.e. installation of a new apparatus) is generally expensive.

JP 2007 277160 also discloses a catalytic reactor.

SUMMARY OF THE INVENTION

The aim of the present invention is to provide a multi-bed catalytic converter which is able to improve the performance efficiency and the conversion yield of the process while minimizing the pressure drops of the converter. A further aim of the present invention is to provide a multi-bed catalytic converter wherein the mechanical and structural containment of the catalyst particles is easy to realize and does not adversely affect the function and the reliability of the catalytic bed collectors.

These aims are reached with a multi-bed catalytic converter according to claim 1. Preferred features of said converter are stated in the dependent claims.

Said multi-bed catalytic converter comprises:

a plurality of catalytic beds which are traversed in series by a process gas, sequentially from a first catalytic bed to a last catalytic bed of said plurality, at least one inter-bed heat exchanger positioned between a first catalytic bed and a second catalytic bed of said plurality, and arranged to remove heat from the process gas leaving the first bed before entering the second bed, the converter being characterized in that at least the last catalytic bed of said plurality is adiabatic and is made of fine catalyst with a particle size not greater than 2 mm.

The term "adiabatic" denotes that said catalytic beds comprise no means to directly cool the catalyst (e.g. a heat exchanger immersed in the catalyst), which means the heat produced by the reaction is fully transferred to the effluent.

All of said catalytic beds are traversed by the process gas with radial flow or axial-radial flow. Each of the catalytic beds of the converter comprises at least one gas distributor and at least one gas collector arrange to provide that the catalytic bed is traversed by the process gas with radial flow or axial-radial flow. The gas distributor and gas collector may be in the form of cylindrical gas-permeable walls.

According to various embodiments said fine catalyst has a particle size of 0.5 mm to 2 mm, 1 mm to 2 mm, 0.5 mm to 1.5 mm, 0.5 mm to 1.3 mm. In a preferred embodiment the particle size is 1.0 mm to 1.4 mm, particularly preferably 1.3 mm or about 1.3 mm. The above ranges for the catalyst size are particularly but not exclusively preferred for a catalyst for the synthesis of ammonia.

The term "particle size" denotes a characteristic dimension of the catalyst particles. For spherical or substantially spherical particles, said size is the diameter. For particles of a non-spherical or irregular shape, the particle size can be represented by a mean diameter. Preferably said mean diameter is the Sauter mean diameter (SMD) which is defined in the literature as the diameter of a sphere that has the same volume/surface ratio as a particle of interest. Accordingly, the Sauter mean diameter can be calculated as a function of the surface area and volume of particles. The mean value of interest can be determined upon the measurement of several particles.

A catalyst having a particle size not greater than 2 mm denotes in this specification a catalyst wherein the particle size of least 90%, preferably at least 95% and more preferably at least 99% of the particles of the catalyst is not greater than 2 mm. A catalyst which satisfies the above condition is termed fine catalyst. A catalyst according to this definition is obtainable by passing catalyst particles through one or more suitable sieves. For example a sieve can be set to allow passage only of catalyst particles smaller than a required size. In some embodiments the size of the catalyst particles may have a statistical distribution, for example a normal distribution (Gaussian curve) around a nominal size.

According to some embodiments of the invention, only the last catalytic bed of said plurality is made of fine catalyst, the other catalytic bed(s) being made of a coarser catalyst with a greater particle size. In some embodiments the latter catalyst has a particle size greater than 2 mm and preferably not greater than 3 mm.

According to a first embodiment of the invention, said plurality of catalytic beds comprises, or consists of, a first catalytic bed and a second catalytic bed, which are traversed sequentially, the first catalytic bed being isothermal or pseudo-isothermal and the second catalytic bed being adiabatic and made of fine catalyst. In a particular embodiment, said first catalytic bed is also made of fine catalyst.

The term "isothermal or pseudo-isothermal" denotes a catalytic bed including a heat exchanger immersed in the catalyst, to remove heat and control the temperature of the bed under operation, said temperature being maintained substantially constant or within a target range. Said heat exchanger includes heat exchange bodies which can be tubes or preferably plates traversed by a cooling medium. An adiabatic catalytic bed in contrast has no heat exchanger immersed in the catalyst.

According to a second embodiment of the invention, said plurality of catalytic beds only contains adiabatic catalytic beds. Preferably, said plurality comprises three adiabatic catalytic beds, which are traversed sequentially from the first to the third catalytic bed.

According to the invention, the third catalytic bed of the above sequence of three adiabatic beds is made of a fine catalyst. The second catalytic bed may be made of either fine catalyst or a coarse catalyst, i.e. including particles greater than 2 mm, for example up to 3 mm. The first catalytic bed of said sequence is made preferably of a coarse catalyst to limit the pressure drop.

The applicant has found that use of the fine catalyst in the third bed and possibly in the second bed provides a significantly higher overall conversion yield at the expense of an acceptable pressure drop. Compared to this scheme, it has been found that using the fine catalyst also in the first bed would result in a significant increase of the pressure drop on one hand, and a negligible advantage of conversion yield on the other hand, as will be more evident from the example 1 below.

In some embodiments, said at least one inter-bed heat exchanger is of the shell-and-tube type. In other preferred embodiments, said at least one inter-bed heat exchanger comprises a plurality of stacked plates, wherein adjacent plates define gaps which are alternately traversed by the effluent of a bed and a cooling medium.

The catalytic beds of said plurality have a circular-cylindrical and more preferably an annular-cylindrical geometry with a central axial cavity wherein said at least one inter-bed heat exchanger is accommodated. Accordingly, said catalytic beds comprise an outer collector and an inner collector, said collectors being cylindrical, coaxial and gas-permeable. Said collectors are advantageously made with perforated walls.

An aspect of the invention relates to the holding of the fine catalyst.

Preferably, each of the catalytic beds of the inventive converter has an annular-cylindrical geometry and comprises an outer gas-permeable collector and an inner gas-permeable collector, said collectors being cylindrical and coaxially arranged one around the other to define the annular-cylindrical shape of a catalytic bed. The outer collector and the inner collector of each catalytic bed containing fine catalyst preferably include any of: a perforated solid wall; a slotted wall; a sintered metal fibre filter; a wall made with a close-knit mesh combined with at least one wall made with wider meshes and/or a slotted plate.

In a preferred embodiment, the collectors bounding the catalytic bed(s) made of fine catalyst comprise a wall made with a close-knit mesh combined with at least one wall made with wider meshes or with a slotted plate. Preferably, said collectors comprise three walls made with mesh, in particular an inner wall and an outer wall made with wider meshes and a central wall made with a close-knit mesh.

The meshes of the close-knit mesh are significantly smaller than the catalyst particles so as to be impermeable to the catalyst. With a catalyst having a particle size of 1-2 mm, said meshes are advantageously smaller than 1 mm; with a catalyst having a particle size of 0.5-1 mm, said meshes are advantageously smaller than 0.5 mm.

Such a combination of walls allows retaining the catalytic beds and at the same time provides mechanical resistance to the collectors.

In a further embodiment, the collectors bounding the catalytic bed(s) made of fine catalyst only comprise slotted plates, namely perforated sheet metals with a slot size smaller than the catalyst particle size. With a catalyst having a particle size of 1.5-2 mm, said slots are preferably non larger than 1.4 mm, more preferably from 0.55 to 0.7 mm; with a catalyst having a particle size of 0.5-1 mm, said slots are preferably from 0.25 to 0.4 mm.

In preferred embodiments, the multi-bed converter of the invention is a converter for the synthesis of ammonia or the synthesis of methanol or for a water-gas-shift reaction or a reactor for the removal of nitrogen oxides.

Another object of the present invention is a method of revamping according to the claims. In a converter comprising at least three adiabatic catalytic beds, said method includes replacing the catalyst of the last catalytic bed, having a particle size greater than 2 mm, with a new catalyst having a smaller particle size that is not greater than 2 mm.

The method is advantageously performed on a converter including at least three catalytic beds. A three-bed layout is a common arrangement of existing old converters and, therefore, there is a need of a method of revamping adapted to update this kind of converter. According to a preferred embodiment of the present invention, said method of revamping also comprises the step of replacing the first and second adiabatic beds with a single isothermal bed, including a heat exchanger immersed in the catalyst. Preferably said method of revamping comprises the step of loading catalyst having a particle size not greater than 2 mm also inside said isothermal catalytic bed.

Further preferred features of the method of revamping are stated in the dependent claims.

In the embodiments encompassing the replacement of adiabatic beds with a single isothermal catalytic bed, said newly installed isothermal bed is larger than the previous first and second adiabatic beds. This method has the advantage that the volume previously used for the passage of the process gas from the first bed to the second bed is made available for the catalyst. This additional volume compensates for the volume occupied by the heat exchanger immersed in the catalyst. As a result, the volume available to accommodate the catalyst in the new isothermal bed remains substantially unchanged with respect to the catalyst volume of the previous two adiabatic beds.

It shall be noted that the invention provides a method for revamping an existing converter and increase its performance without the need of an expensive add-on.

The use of a isothermal catalytic bed, to replace the adiabatic beds, allows to control the temperature within a small range, ideally close to the temperature of maximum reaction rate, which corresponds to the highest possible conversion for a given catalyst volume. Therefore, for a given catalyst volume, the process performances in an isothermal bed are much better than in an adiabatic bed, and replacing the first and second adiabatic bed with a single isothermal bed provides optimum exploitation of the first bed which is the most critical, being fed with the fresh and more reactive charge.

The advantages of the invention will emerge more clearly from the following detailed description.

DETAILED DESCRIPTION OF THE INVENTION

Figure 1:
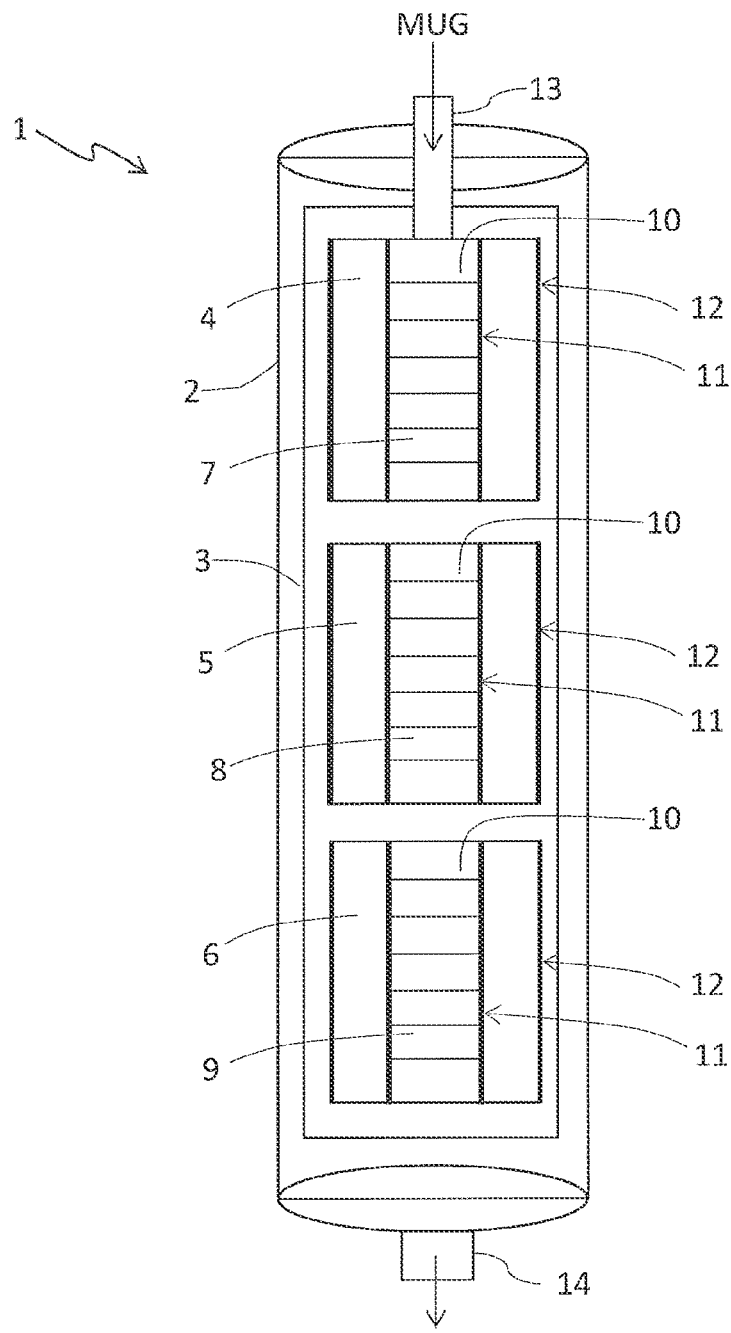
FIG. 1 is a simplified scheme of a multi-bed ammonia converter according to the prior art.

FIG. 1 illustrates a multi-bed converter 1, for example an ammonia converter, including a vessel 2 and a catalytic cartridge 3 comprising three adiabatic catalytic beds 4, 5, 6 arranged in series, two inter-bed heat exchangers 7, 8 and optionally a bottom heat exchanger 9. According to the example of the figure, said heat exchangers 7, 8, 9 are plate heat exchangers; alternatively, they may be shell-and-tube heat exchangers.

Each bed 4, 5, 6 is traversed by a radial inward or mixed axial-radial flow and has an annular cylindrical shape with a central axial cavity 10. The plate heat exchangers 7, 8, 9 are arranged in said central cavities 10 to provide inter-bed cooling of the gaseous products evolving from one catalytic bed to another.

Said catalytic beds 4, 5, 6 are adiabatic since they contain no cooling means and the heat of the reaction is fully transferred to the gaseous stream of reactants and products.

Said catalytic beds 4, 5, 6 contain catalyst particles with an irregular shape and a size greater than 2 mm. Said catalyst particles are, for example, iron-based.

Each catalytic bed 4, 5, 6 comprises two gas-permeable coaxial walls which define respectively an inner containing wall 11 and an outer containing wall 12. The outer wall 12 acts as a distributor of the gas entering the catalytic bed. The inner wall 11 acts as a collector of the gaseous products leaving the catalytic bed. Said walls 11, 12 are provided with holes or openings of a suitable size so that they are permeable to gas and at the same time are able to mechanically and structurally retain the catalyst. Said two coaxial containing walls are also referred to as outer collector and inner collector.

A fresh make-up gas (MUG) is fed to the converter 1 through the gas inlet 13 and enters the first bed 4 by passing through the outer collector 12; the effluent of the first bed 4 enters the first inter-bed exchanger 7 by passing through the inner collector 11 and is cooled while flowing through the plates of said exchanger 7; the cooled effluent enters the second bed 5 via the respective outer collector 12. Similarly, the effluent of the second bed 5 is cooled in the second inter-bed heat exchanger 8 before entering the third bed 6, and the effluent of the third bed 6 is cooled in the bottom heat exchanger 9 before leaving the converter 1 via the outlet 14.

The reactor of FIG. 1 is known in the art and need not be described in a further detail.

Figure 2:
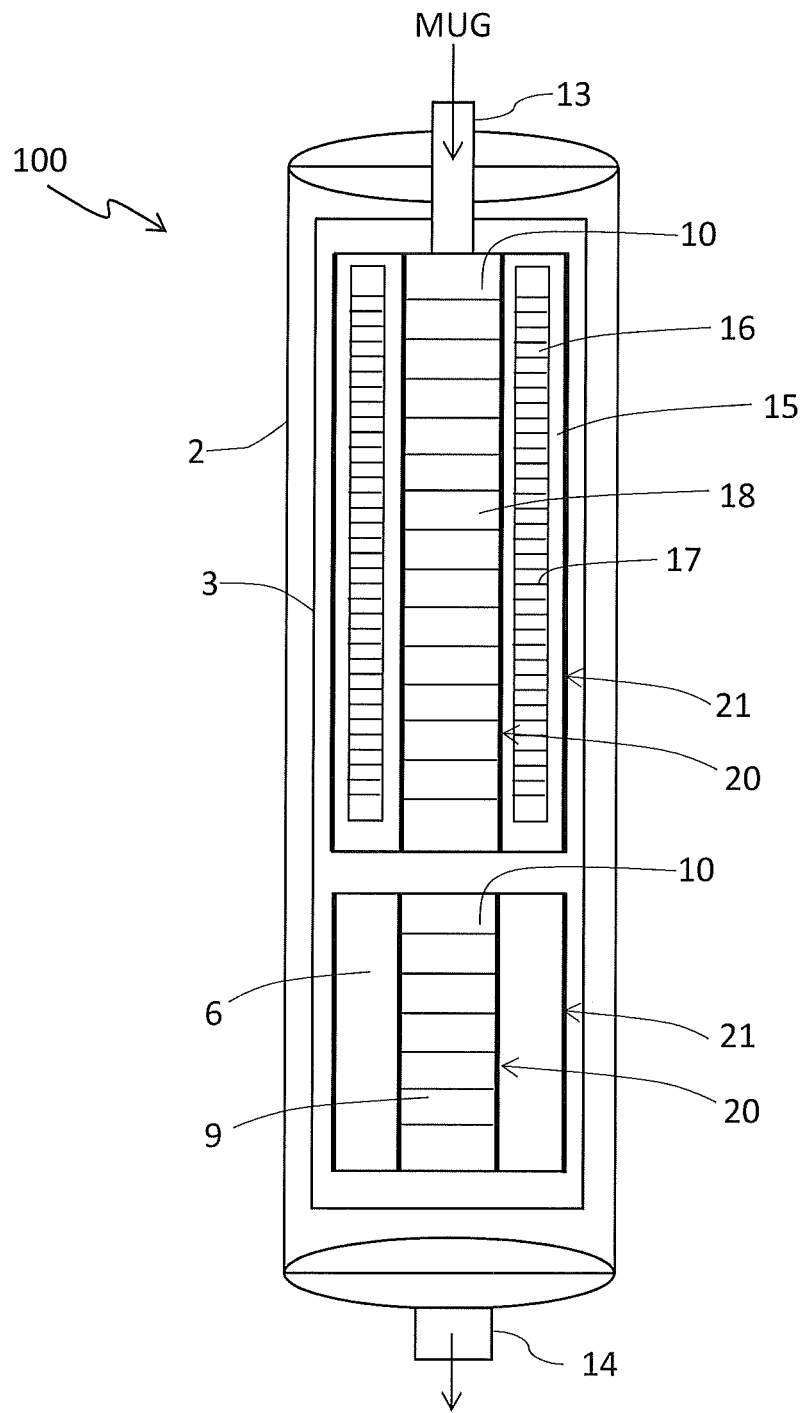
FIG. 2 is a scheme of the converter of FIG. 1 after a revamping in accordance with an embodiment of the invention.

FIG. 2 shows the reactor 100 as revamped according to an embodiment of the invention. In particular, the reactor 100 results from revamping the reactor 1 by means of the following steps:

replacing the first and second adiabatic beds with a single bed 15 and installing a plate heat exchanger 16 including a plurality of heat exchange plates 17 inside the new single bed 15, so that it operates isothermally;

replacing the two inter-bed heat exchangers with a single heat exchanger 18;

loading the new catalytic bed 15 with a fine catalyst having a particle size not greater than 2 mm and a gaussian size distribution for instance between 1 and 2 mm;

replacing the catalyst contained in the third adiabatic bed with catalyst of the same kind but having a finer particle size, wherein the particles are not greater than 2 mm.

Despite installation of heat exchange plates 17 subtracts volume available for the catalyst, the catalyst volume of the new isothermal bed 16 remains unchanged with respect to the catalyst volume of the adiabatic beds 4, 5, because the reactor volume previously used for the passage of the effluent of the first bed 4 to the second bed 5 is now loaded with catalyst.

Figure 3:
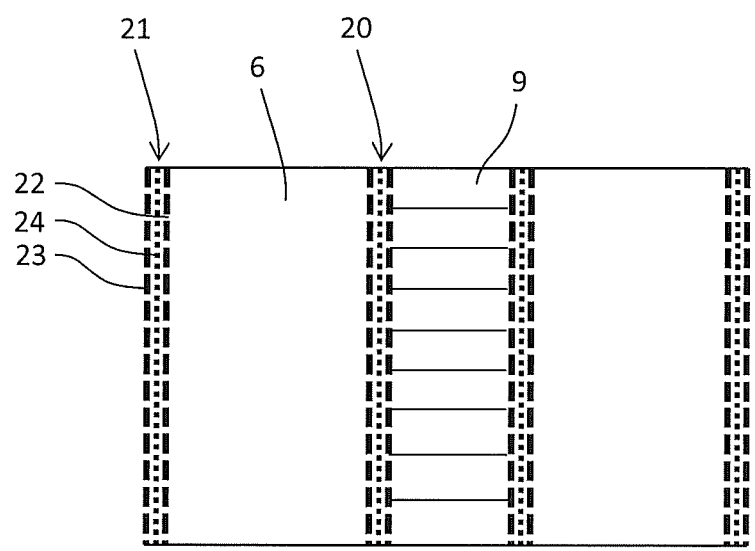
FIG. 3 shows a schematic cross-sectional view of a catalytic bed of the converter of FIG. 2, according with an embodiment of the invention.

Reactor 1 has also been revamped by installing new inner collectors 20 and outer collectors 21 able to retain the newly loaded finer catalyst particles. Said new inner and outer collectors 20, 21 are illustrated in FIG. 3 with reference to the adiabatic catalytic bed 6. New collectors 20, 21 are also installed to bound the catalyst contained in the isothermal bed 15.

The heat exchange plates 17 are radially arranged in the isothermal bed 15. Each of said plates 17 is internally traversed by a cooling medium, such as water. As a result, the first catalytic bed 15 of the revamped converter 100 operates in an isothermal manner and the temperature of the first bed 15 can be controlled with an additional degree of freedom by regulating the cooling medium flow and/or temperature through the plates 17.

FIG. 3 shows in schematic form a cross-sectional view of the adiabatic catalytic bed 6 of the revamped reactor 100 according to FIG. 2, wherein the outer collector 21 (distributor) and the inner collector 20 are visible. The distributor 21 and the collector 20 comprise coaxial cylindrical walls which are gas-permeable as a result of holes or openings. According to the example of the figure, said distributor 21 and collector 20 comprise three walls made with mesh, in particular an inner wall 22 and an outer wall 23 made with wider meshes and a central wall 24 made with a close-knit mesh; a solid wall perforated or slotted or both is providing the structural resistance to the catalytic bed.

EXAMPLES

Example 1

The following Table 1 refers to a multi-bed catalytic converter of an ammonia plant with a capacity of 1850 metric tonnes per day (MTD) of ammonia produced and with an inert content of 11% at the inlet of the converter. Said converter contains three adiabatic beds in series containing iron-based catalyst. The first bed has a volume of 5 $m^3$, the second bed a volume of 8 $m^3$ and the third bed a volume of 31 $m^3$.

Table 1 compares the values of pressure drops and conversion yields for the following configurations of the converter and considering its effect in the synthesis loop:

1.1 Converter of the prior art wherein all beds contain a relatively coarse catalyst. Each bed comprises catalyst particles ranging from 1.5 mm to 3 mm size.

1.2 Converter according to the invention wherein the first and second beds contain catalyst with particles from 1.5 mm to 3 mm and the third bed contains a fine catalyst with particles from 1 mm to 2 mm, i.e. the third bed does not contain particles over 2 mm.

1.3 Converter according to the invention wherein the first bed contains the 1.5 mm to 3 mm coarse catalyst and the second bed and third bed contain a fine catalyst with particles from 1 mm to 2 mm.

1.4 Converter wherein all beds contain a fine catalyst with particles from 1 mm to 2 mm.

TABLE 1

|  | 1.1<br>Coarse catalyst in all beds (prior art) | 1.2<br>Fine catalyst in the $3^{rd}$ bed | 1.3<br>Fine catalyst in the $2^{nd}$ and $3^{rd}$ beds | 1.4<br>Fine catalyst in all beds |
|---|---|---|---|---|
| Pressure drop [bar] | 5 | 4.9 | 5.1-5.2 | 5.5-5.6 |
| Conversion [% mol] | 17.4 | 18.5 | 18.9 | 19.1 |

The table shows that configuration 1.2 of the converter, wherein the fine catalyst is used only in the third bed, allows obtaining a higher overall conversion yield and lower pressure drops than the configuration 1.1, wherein all beds contain the coarse catalyst. The lower pressure drop is due to decreased circulation, consequently to the higher ammonia conversion.

Configuration 1.3 of the converter, wherein the fine catalyst is used both in the second bed and in the third bed, allows obtaining a higher overall conversion than configuration 1.1 and configuration 1.2. In this case, the pressure drops are only slightly increased and such an increase is considered acceptable in view of the significant increase of the conversion yield.

Configuration 1.4 shows that the use of the fine catalyst in all beds results in a higher conversion yield but also entails a significant increase of the pressure drops which is not compensated by the higher conversion.

Example 2

The following Table 2 refers to a multi-bed catalytic converter of an ammonia plant with a capacity of 1935 metric tonnes per day (MTD) of ammonia produced, with an inert content of 15.5% at the inlet of the converter and an inlet pressure of 248.5 bar.

Table 2 compares the values of pressure drops and conversion yields for the following configurations of the converter:

2.1 Converter of the prior art comprising three adiabatic beds, wherein all beds contain a relatively coarse catalyst and each bed contains particles ranging from 1.5 mm to 3 mm.

2.2 Converter according to the invention comprising three adiabatic beds, wherein the first and second beds contain the coarse catalyst and the third bed contains a fine catalyst with particles from 1 mm to 2 mm.

2.3 Converter according to the invention comprising a first isothermal bed and a second adiabatic bed, wherein the first isothermal contains substantially the same catalyst volume as the first two adiabatic reactors as configuration 2.2, the first isothermal bed contains a 1.5 to 3 mm coarse catalyst and the second adiabatic bed contains a fine catalyst with particles from 1 mm to 2 mm.

2.4 Converter according to the invention comprising a first isothermal bed and a second adiabatic bed both containing a fine catalyst with particles from 1 mm to 2 mm, wherein the first isothermal bed contains substantially the same volume of catalyst as the first two adiabatic beds of configuration 2.2.

TABLE 2

|  | 2.1<br>3 adiabatic beds<br>Coarse catalyst in all beds (prior art) | 2.2<br>3 adiabatic beds<br>Fine catalyst in the $3^{rd}$ bed | 2.3<br>$1^{st}$ isot. bed + $2^{nd}$ adiab. bed<br>Fine catalyst in the $2^{nd}$ bed | 2.4<br>$1^{st}$ isot. bed + $2^{nd}$ adiab. bed<br>Fine catalyst in all beds |
|---|---|---|---|---|
| Pressure drop [bar] | 4.2 | 4.0 | 3.8 | 3.7 |
| Conversion [% mol] | 18.6 | 19.5 | 20 | 20.5 |

For configuration 2.2 of the converter, wherein the fine catalyst is used only in the third bed of a series of three adiabatic beds, the same considerations as configuration 1.2 of Example 1 apply.

In configuration 2.3, the use of coarse catalyst in the first isothermal bed and fine catalyst in the second adiabatic bed allows a significant increase in the conversion yield and a decrease in the pressure drops.

In configuration 2.4, the use of fine catalyst in the first isothermal bed and in the second adiabatic bed allows an additional increase in the conversion yield and a decrease in the pressure drops.

Example 3

The following Table 3 refers to a multi-bed catalytic converter of an ammonia plant with a capacity of 1935 metric tonnes per day (MTD) of ammonia produced, with an inert content of 15.5% at the inlet of the converter and an inlet pressure of 248.5 bar.

Said converter contains three adiabatic beds in series and Table 3 compares the values of pressure drops and conversion yields for the following configurations:

3.1 Converter with shell-and-tube inter-bed heat exchangers.

3.2 Converter with plate inter-bed heat exchangers.

TABLE 3

|  | 3.1<br>3 adiabatic beds<br>Coarse catalyst (1.5<br>to 3 mm) in all beds | 3.2<br>3 adiabatic beds (plate<br>heat exchangers)<br>Fine catalyst (1-2 mm)<br>in the 3$^{rd}$ bed |
|---|---|---|
| Pressure drop [bar] | 4.2 | 2.5 |
| Conversion [% mol] | 18.6 | 19.5 |

The table shows that for configuration 3.2 with plate inter-bed heat exchangers, the pressure drops are much lower and the conversion yield significantly higher than configuration 3.1 with shell-and-tube inter-bed heat exchangers.

The invention claimed is:

1. A multi-bed catalytic converter, comprising:
   a plurality of catalytic beds which are traversed in series by a process gas, sequentially from a first catalytic bed to a last catalytic bed of said plurality of catalytic beds; and
   at least one inter-bed heat exchanger positioned between the first catalytic bed and a second catalytic bed of said plurality of catalytic beds, and arranged to remove heat from the process gas leaving the first catalytic bed before entering the second catalytic bed;
   wherein at least the last catalytic bed of said plurality of catalytic beds is adiabatic and is made of a fine catalyst with a particle size not greater than 2 mm;
   wherein each of the plurality of catalytic beds includes at least one gas distributor and at least one gas collector arrange to provide that the catalytic bed is traversed by the process gas with a radial flow or axial-radial flow;
   wherein only the last catalytic bed of said plurality of catalytic beds is made of the fine catalyst, one or more other catalytic beds of the plurality of catalytic beds being made of catalyst with greater particle size.

2. The multi-bed catalytic converter of claim 1, wherein the particle size of said fine catalyst is 0.8 mm to 1.4 mm.

3. The multi-bed catalytic converter of claim 2, wherein the particle size is 0.8 mm to 1.4 mm.

4. The multi-bed catalytic converter of claim 2, wherein the catalyst of the one or more other catalytic beds of the plurality of catalytic beds include a particles size of great than 2 mm and up to 3 mm.

5. The multi-bed catalytic converter of claim 1, wherein said fine catalyst has a particle size of 1.3 mm or about 1.3 mm.

6. The multi-bed catalytic converter of claim 1, wherein said at least one inter-bed heat exchanger includes a plurality of stacked plates, wherein gaps between adjacent plates of the plurality of stacked plates are alternately traversed by the process gas and a cooling medium.

7. The multi-bed catalytic converter of claim 1, wherein said plurality of catalytic beds have an annular-cylindrical geometry and comprise an outer gas-permeable collector and an inner gas-permeable collector, said collectors being cylindrical and coaxial, wherein the inner collector and the outer collector of each catalytic bed containing fine catalyst include any of: a perforated solid wall; a slotted wall; a sintered metal fibre filter; a wall made with a close-knit mesh combined with at least one wall made with wider meshes and/or a slotted plate.

8. A method for revamping a multi-bed catalytic converter, wherein said converter includes:
   at least three catalytic beds which are traversed in series by a radial flow or an axial-radial flow of a process gas, sequentially from a first catalytic bed to a last catalytic bed of said plurality of catalytic beds; and
   at least a first inter-bed heat exchanger or a first quencher with a gas stream arranged between a first catalytic bed and a second catalytic bed to cool the effluent of said first bed before admission into the second bed, and a second inter-bed heat exchanger or a second quencher with a gas stream arranged between the second catalytic bed and a third catalytic bed to cool the effluent of said second bed before admission into the third bed,
   wherein said catalytic beds are made of catalyst with a particle size greater than 2 mm,
   the method comprising:
      replacing the catalyst of only the last catalytic bed with catalyst having a particle size not greater than 2 mm.

9. The method of claim 8, wherein the particle size is 0.8 mm to 1.4 mm.

10. The method of claim 8, wherein the particle size is 1.0 mm to 1.4 mm.

11. The method of claim 8, wherein the particle size is 1.3 mm or about 1.3 mm.

12. The method of claim 8, further comprising:
    removing the first and second catalytic beds and the first and second inter-bed heat exchangers or quenchers; and
    installing a single isothermal bed to replace said first and second adiabatic beds, said isothermal bed containing a heat exchanger.

13. The method of claim 12, wherein the heat exchanger includes a plurality of heat exchange plates immersed in the catalyst of said isothermal bed.

14. The method of claim 8, wherein the first catalytic bed and the second catalytic bed having an annular-cylindrical geometry and accommodating a first inter-bed heat exchanger and a second inter-bed heat exchanger which are coaxial, the method being characterized by replacing the first and second adiabatic beds with a single isothermal bed containing a heat exchanger, and by replacing the first and second inter-bed heat exchangers with a new inter-bed heat exchanger coaxial and inner to said isothermal bed.

15. The method of claim 14, wherein said single isothermal catalytic bed is larger than the previous first catalytic bed and second catalytic bed, so that the volume used to accommodate the catalyst is substantially unchanged.

* * * * *